(12) United States Patent
Choi et al.

(10) Patent No.: US 12,264,771 B2
(45) Date of Patent: Apr. 1, 2025

(54) ROBOT TRAVELING DEVICE

(71) Applicant: RESEARCH & BUSINESS FOUNDATION SUNGKYUNKWAN UNIVERSITY, Suwon-si (KR)

(72) Inventors: Hyouk Ryeol Choi, Suwon-si (KR); Yechan Lee, Suwon-si (KR); Hui Sik Jang, Suwon-si (KR); Tae Yu Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 223 days.

(21) Appl. No.: 18/101,622

(22) Filed: Jan. 26, 2023

(65) Prior Publication Data

US 2023/0250914 A1 Aug. 10, 2023

(30) Foreign Application Priority Data

Feb. 10, 2022 (KR) .................. 10-2022-0017512

(51) Int. Cl.
| | |
|---|---|
| *B25J 5/00* | (2006.01) |
| *F16L 55/34* | (2006.01) |
| *F16L 55/40* | (2006.01) |
| *F16L 101/30* | (2006.01) |

(52) U.S. Cl.
CPC ............... *F16L 55/40* (2013.01); *F16L 55/34* (2013.01); *F16L 2101/30* (2013.01)

(58) Field of Classification Search
CPC ....... F16L 55/40; F16L 55/34; F16L 2101/30; F16L 55/32; F16L 55/30; G03B 37/005; B25J 5/007; B25J 5/005; B25J 9/1671; B25J 19/0091

USPC ......................................................... 700/245
See application file for complete search history.

(56) References Cited

U.S. PATENT DOCUMENTS

| | | | |
|---|---|---|---|
| 7,572,091 B1* | 8/2009 | Collins ................ | B60P 1/6454 414/478 |
| 2008/0269986 A1* | 10/2008 | Regnell .............. | B60G 17/0523 701/37 |
| 2016/0362146 A1* | 12/2016 | Trowbridge ......... | B62D 53/062 |
| 2019/0077212 A1* | 3/2019 | Imaoka ............... | B60G 17/0161 |
| 2021/0347060 A1* | 11/2021 | Byl ....................... | B25J 11/009 |

(Continued)

FOREIGN PATENT DOCUMENTS

| | | | | |
|---|---|---|---|---|
| CN | 104071251 A | | 10/2014 | |
| CN | 115451239 A | * | 12/2022 | |
| CN | 109466268 B | * | 4/2023 | ......... B60G 17/0161 |

(Continued)

OTHER PUBLICATIONS

JP2014034299.translate (Year: 2014).*

(Continued)

*Primary Examiner* — B M M Hannan
(74) *Attorney, Agent, or Firm* — NSIP Law (57) ABSTRACT

The present disclosure relates to a robot traveling device including a body part, a moving part that slidably moves in a longitudinal direction of the body part, a front end traveling part that is rotatably mounted on the body part and the moving part and is rotatable by contact friction, and a rear end traveling part that is rotatably mounted on the body part and the moving part and is rotatable by contact friction.

9 Claims, 10 Drawing Sheets

(56) References Cited

U.S. PATENT DOCUMENTS

2023/0366773 A1 * 11/2023 Teyhan ............... G01M 5/0041

FOREIGN PATENT DOCUMENTS

| | | | | |
|---|---|---|---|---|
| JP | H0725217 A | * | 1/1995 | |
| JP | H07144521 A | * | 6/1995 | |
| JP | H07285085 A | * | 10/1995 | |
| JP | 3004856 B2 | * | 1/2000 | |
| JP | 2004215499 A | * | 7/2004 | ........... B60K 17/356 |
| JP | 2014034299 A | * | 2/2014 | |
| JP | 5946037 B2 | * | 7/2016 | |
| KR | 100797907 B1 | * | 1/2008 | |
| KR | 10-2010-0002764 A | | 1/2010 | |
| KR | 101469016 B1 | * | 12/2014 | |
| KR | 10-2015-0078119 A | | 7/2015 | |
| KR | 101802205 B1 | * | 11/2017 | |
| KR | 2013301 B1 | * | 10/2019 | ............ A47C 1/022 |
| KR | 20200083283 A | * | 7/2020 | |
| KR | 102277025 B1 | * | 6/2021 | |
| KR | 20210066496 A | | 6/2021 | |
| KR | 20220075796 A | | 6/2022 | |
| SE | 529218 C2 | * | 6/2007 | ........... B60G 17/019 |
| WO | WO-2017113506 A1 | * | 7/2017 | ............. B65B 61/00 |
| WO | WO-2021230423 A1 | * | 11/2021 | ............. B25J 11/00 |
| WO | WO-2022061394 A1 | * | 3/2022 | ............. B65G 27/00 |

OTHER PUBLICATIONS

KR101802205.translate (Year: 2017).*
KR20210066496A.translate (Year: 2021).*
Korean Office Action issued on Dec. 27, 2023, in counterpart Korean Patent Application No. 10-2022-0017512 (5 pages in Korean).

* cited by examiner

ROBOT TRAVELING DEVICE

CROSS-REFERENCE TO RELATED APPLICATION

This application claims the benefit under 35 USC § 119(a) of Korean Patent Application No. 10-2022-0017512, filed on Feb. 10, 2022, the entire disclosure of which are incorporated herein by reference for all purposes.

BACKGROUND

1. Field of the Invention

The present disclosure relates to a robot traveling device, and more particularly, to a robot traveling device which may satisfy both flexibility and an adhesive force by automatically distributing a load while passing through a pipe.

2. Discussion of Related Art

In general, almost all driving modules used in mobile robots are designed in consideration of suspension. The driving modules are designed to be flexibly changed according to an external ground state so that the driving modules are used as traveling modules. In this case, since it is enough to consider only a weight of a body as an applied load, an idler individually implements the suspension by appropriately selecting a spring constant.

However, in the case of a driving module used in a pipe robot, a traction force factor should be additionally considered, and the traction force is proportional to a surface friction coefficient to a gripping force (an adhesive force) that is a force applied to a wall by the driving module.

When the driving module of the pipe robot is designed in the conventional method (a method in which the suspension is implemented in each idler), the flexibility and adhesive force are in a trade-off relationship, and thus one of the two factors should be abandoned.

In order to solve this problem, a robot using a pneumatic component as the suspension has been manufactured. However, in the case of a pneumatic method, since a pneumatic line is essential, a wireless robot cannot be manufactured, and a maximum adhesive force is limited. Therefore, it is required to improve this problem.

The background technology of the present disclosure is disclosed in Korean Patent Publication No. 2015-0078119 (published on Jul. 8, 2015, Title of the Invention: Moving Robot for Inspecting Inside of Pipe).

SUMMARY OF THE INVENTION

The present disclosure is directed to providing a robot traveling device capable of automatically distributing a load to simultaneously satisfy flexibility and an adhesive force while passing through a pipe.

A robot traveling device includes a body part, a moving part that slidably moves in a longitudinal direction of the body part, a front end traveling part that is rotatably mounted on the body part and the moving part and is rotatable by contact friction, and a rear end traveling part that is rotatably mounted on the body part and the moving part and is rotatable by contact friction, wherein loads of the front end traveling part and the rear end traveling part are shared through the moving part.

The body part may include a body housing portion having a length in a left-right direction, and a body space part formed in a longitudinal direction of the body housing portion and providing a movement space for the moving part.

The moving part may include a moving line portion disposed in the longitudinal direction of the body part, and a moving connection portion that slidably moves along the moving line portion.

The front end traveling part and the rear end traveling part may be connected to the moving connection portion and may be rotatable on the same axis.

The front end traveling part and the rear end traveling part may each be rotatably connected to one of a pair of moving connection portions.

The front end traveling part may include a front end main rod portion rotatably mounted on the moving part, a front end support rod portion having both ends rotatably connected to a front end of the body part and the front end main rod portion, a front end connection rod portion rotatably connected to the front end main rod portion, and a front end wheel portion that is rotatably mounted on the front end connection rod portion and is rotatable by contact friction.

The rear end traveling part may include a rear end main rod portion rotatably mounted on the moving part, a rear end support rod portion having both ends rotatably connected to a rear end of the body part and the rear end main rod portion, a rear end connection rod portion rotatably connected to the rear end main rod portion, and a rear end wheel portion that is rotatably mounted on the rear end connection rod portion and is rotatable by contact friction.

The robot traveling device may further include a restoration part that is supported by the body part and provides a restoring force to the moving part.

The robot traveling device may further include a power generation unit that is mounted on the body part and generates power, and a traveling belt part that surrounds the body part, is supported by the front end traveling part and the rear end traveling part, and moves the body part while moving in a caterpillar manner by the power generation unit.

The power generation unit may be driven in a wired or wireless manner.

The robot traveling device may further include a detection unit that detects deformation of the front end traveling part and the rear end traveling part, and a modeling unit that receives a detection signal of the detection unit to model a pipe shape.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a robot traveling device according to embodiments of the present disclosure will be described with reference to the accompanying drawings. In this process, the thicknesses of lines or the sizes of components illustrated in the drawings may be exaggerated for clarity and convenience of description. Further, terms described below are terms defined in consideration of functions in the present disclosure and may change according to the intention or custom of a user or an operator. Therefore, definitions of these terms should be made based on the contents throughout the present specification.

Figure 1:
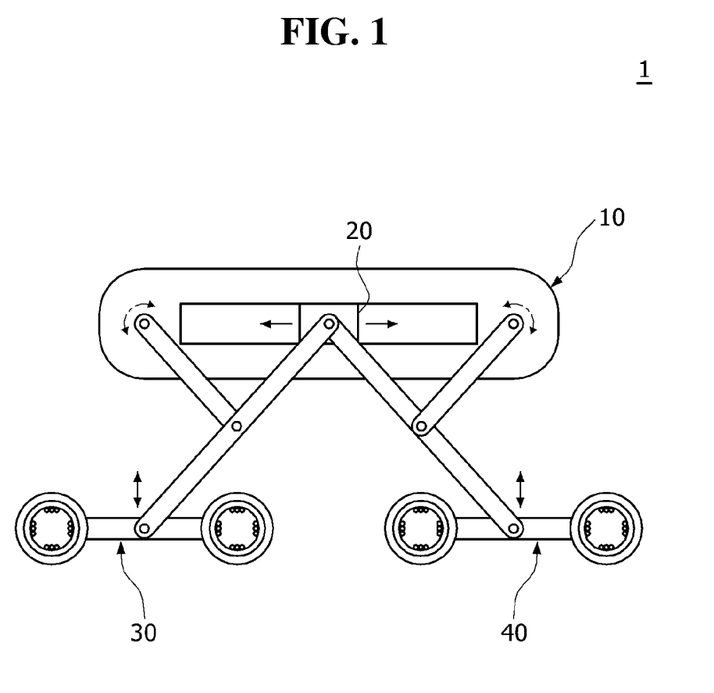
FIG. 1 is a schematic view illustrating a robot traveling device according to an embodiment of the present disclosure.

FIG. 1 is a schematic view illustrating a robot traveling device according to an embodiment of the present disclosure. Referring to FIG. 1, a robot traveling device 1 according to the embodiment of the present disclosure may include a body part 10, a moving part 20, a front end traveling part 30, and a rear end traveling part 40.

The body part 10 may form a frame of the robot traveling device 1. In the body part 10, a circuit board for operating a pipe robot may be embedded, and a sensor for detecting a state of a pipe may be installed.

The moving part 20 may slidably move in a longitudinal direction of the body part 10. As an example, the body part 10 has a length in a left-right direction, and the moving part 20 may slidably move in the left-right direction.

The front end traveling part 30 is rotatably mounted on the body part 10 and the moving part 20 and is rotated by contact friction to guide traveling of the body part 10. The rear end traveling part 40 is rotatably mounted on the body part 10 and the moving part 20 and is rotated by contact friction to guide traveling of the body part 10.

The front end traveling part 30 and the rear end traveling part 40 may have shapes symmetrical to each other, and may be interchangeably called according to a traveling direction of the body part 10. As an example, when the body part 10 travels in a leftward direction, the front end traveling part 30 may be disposed on a left side of the body part 10, and the rear end traveling part 40 may be disposed on a right side of the body part 10. When the body part 10 travels in a rightward direction, the front end traveling part 30 may be disposed on a right side of the body part 10, and the rear end traveling part 40 may be disposed on a left side of the body part 10. Meanwhile, one or more sets of the front end traveling part 30 and the rear end traveling part 40 may be mounted on the body part 10. When the front end traveling part 30 and the rear end traveling part 40 are arranged as a plurality of sets of front end traveling parts 30 and rear end traveling parts 40, a plurality of moving parts 20 may be arranged in the longitudinal direction of the body part 10, and the front end traveling part 30 and the rear end traveling part 40 may be connected to the respective moving parts 20.

When the body part 10 travels along the pipe or the ground, loads of the front end traveling part 30 and the rear end traveling part 40 are shared through the moving part 20. That is, when the front end traveling part 30 raises while passing over an obstacle, the load may be distributed to the rear end traveling part 40 through the moving part 20, and when the rear end traveling part 40 raises while passing over an obstacle, the load may be distributed to the front end traveling part 30 through the moving part 20. Accordingly, the robot traveling device 1 may smoothly pass over an obstacle in the pipe and obtain high traction even on a curved surface.

Meanwhile, the moving parts 20 may be arranged on both sides of the body part 10, the front end traveling part 30 and the rear end traveling part 40 are arranged in the respective moving parts 20, and thus the body part 10 can be stably supported.

Figure 2:
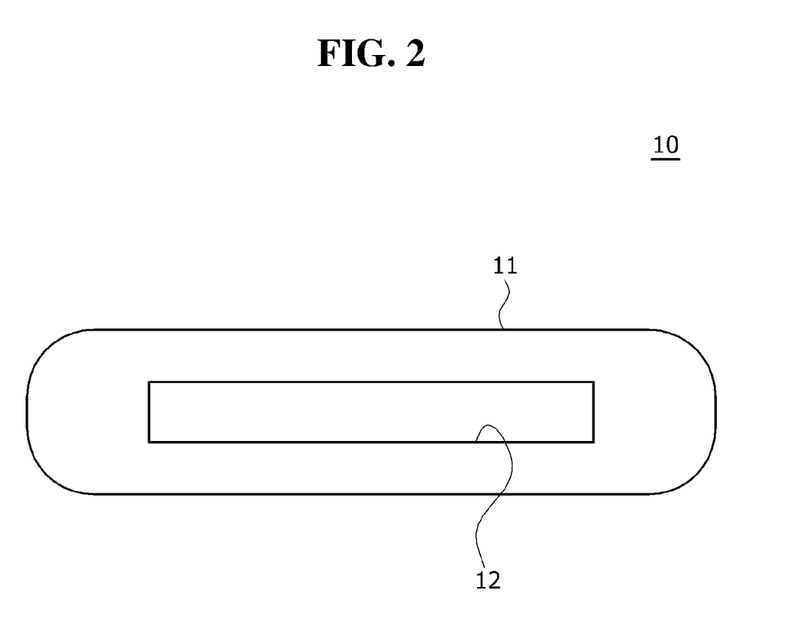
FIG. 2 is a schematic view illustrating a body part according to an embodiment of the present disclosure.

FIG. 2 is a schematic view illustrating a body part according to an embodiment of the present disclosure. Referring to FIG. 2, the body part 10 according to the embodiment of the present disclosure includes a body housing portion 11 and a body space portion 12.

The body housing portion 11 has a length in a left-right direction. As an example, a sensor for inspecting the pipe and a circuit board may be embedded in the body housing portion 11.

The body space portion 12 is formed in a left-right direction of the body housing portion 11 and provides a movement space of the moving part 20. As an example, the body space portion 12 may be a hole or groove formed in a longitudinal direction of the body housing portion 11.

Figure 3A:
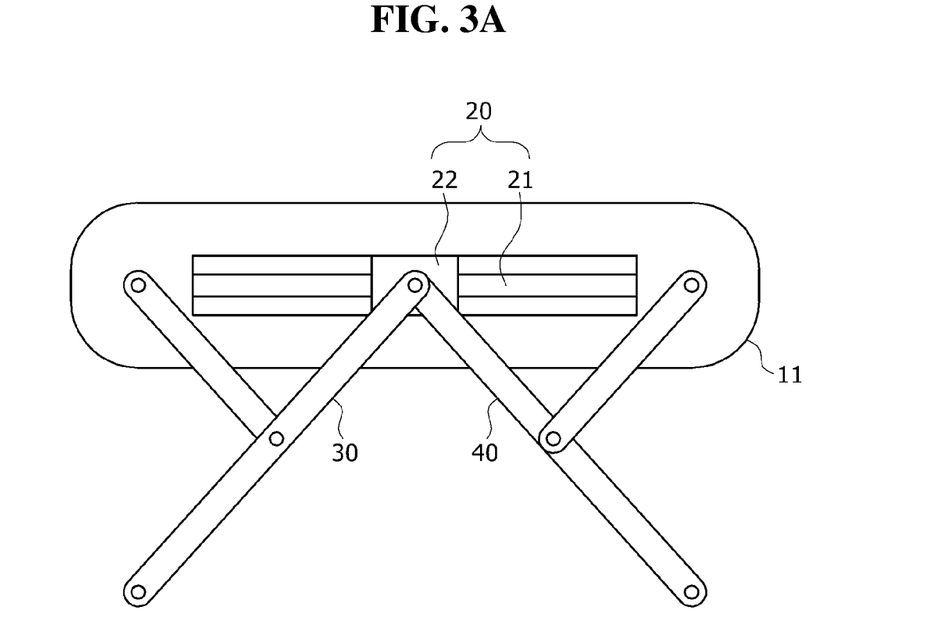
FIGS. 3A and 3B are schematic views illustrating a moving part according to an embodiment of the present disclosure.
Figure 3B:
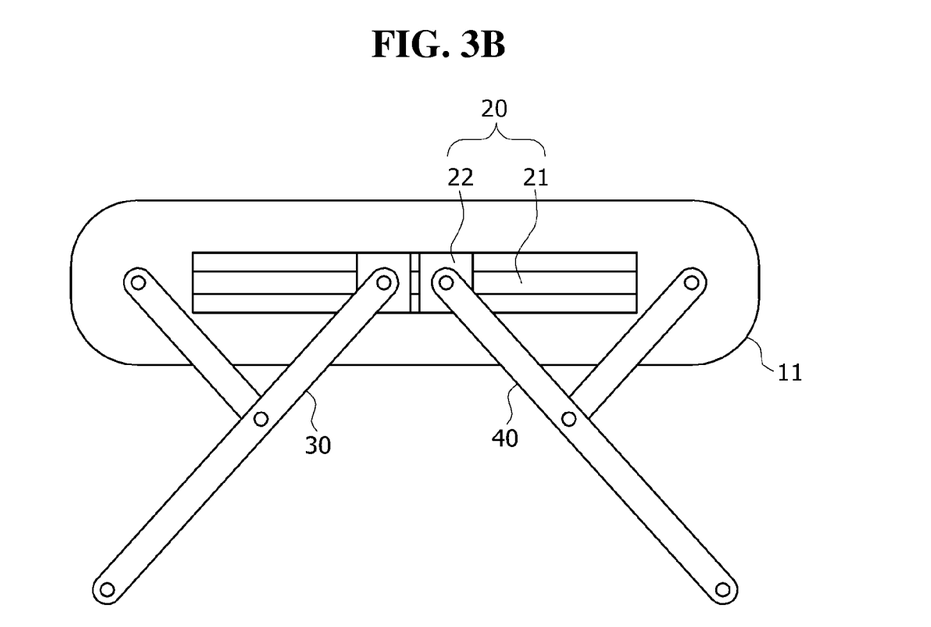

FIGS. 3A and 3B are schematic views illustrating a moving part according to an embodiment of the present disclosure. Referring to FIGS. 3A and 3B, the moving part 20 according to the embodiment of the present disclosure includes a moving line portion 21 and a moving connection portion 22.

The moving line portion 21 is disposed in the longitudinal direction of the body part 10. As an example, the moving line portion 21 may be mounted on the body housing portion 11 and disposed on the body space portion 12. The moving line portion 21 may be embedded in the body housing portion 11 or mounted outside the body housing portion 11.

The moving connection portion 22 slidably moves along the moving line portion 21. As an example, the moving connection portion 22 may be slidably connected to the moving line portion 21 and may move along the moving line portion 21 due to an external force. A bearing for suppressing friction when the moving connection portion 22 is in contact with the moving line portion 21 may be provided in the moving connection portion 22.

Meanwhile, the front end traveling part 30 and the rear end traveling part 40 may be simultaneously connected to the moving connection portion 22. That is, the front end traveling part 30 and the rear end traveling part 40 may be connected to the moving connection portion 22 and may be rotatable on the same axis (see FIG. 3A). In this case, according to a design, the front end traveling part 30 and the rear end traveling part 40 may be arranged on different axes.

In addition, the front end traveling part 30 and the rear end traveling part 40 may each be rotatably connected to one of a pair of moving connection portions 22 (see FIG. 3B). In this case, the pair of moving connection portions 22 may be arranged consecutively or connected through a separate connection member.

Figure 4:
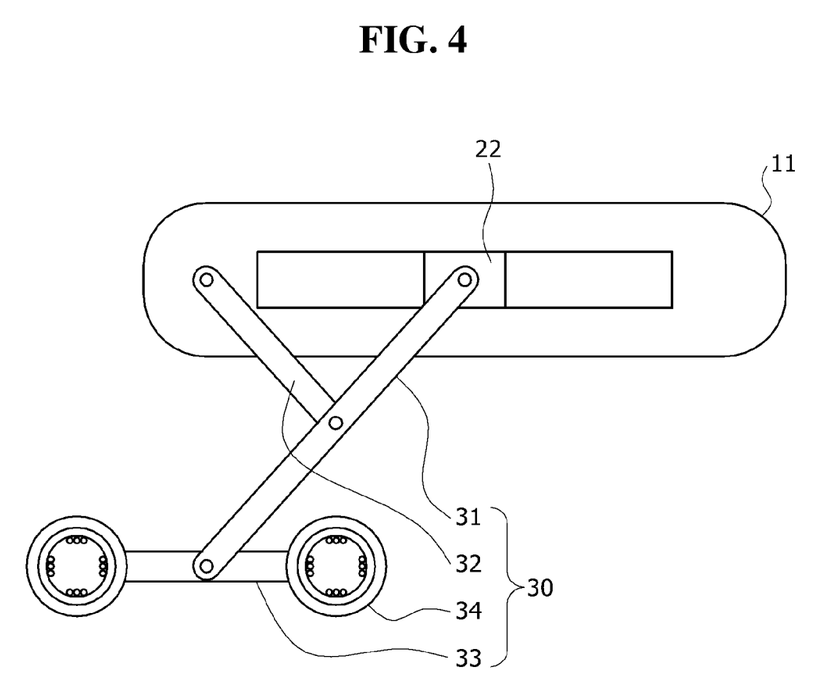
FIG. 4 is a schematic view illustrating a front end traveling part according to an embodiment of the present disclosure.

FIG. 4 is a schematic view illustrating a front end traveling part according to an embodiment of the present disclosure. Referring to FIG. 4, the front end traveling part 30 according to the embodiment of the present disclosure includes a front end main rod portion 31, a front end support rod portion 32, a front end connection rod portion 33, and a front end wheel portion 34.

The front end main rod portion 31 is rotatably mounted on the moving part 20. As an example, an upper end of the front end main rod portion 31 may be rotatably mounted on the moving connection portion 22 and may be disposed obliquely downward in a leftward (frontward) direction of the body housing portion 11.

Both ends of the front end support rod portion 32 are rotatably connected to a front end of the body part 10 and the front end main rod portion 31. As an example, the front end support rod portion 32 may rotate in a state in which a position thereof is fixed to a front end of the body housing portion 11 and may be rotatably connected to a central portion of the front end main rod portion 31. Accordingly, a lower end of the front end main rod portion 31 may move in a vertical direction.

The front end connection rod portion 33 is rotatably connected to the front end main rod portion 31. As an example, a central portion of the front end connection rod portion 33 may be connected to a lower end of the front end main rod portion 31. A pin spring for restoration may be embedded in the front end connection rod portion 33.

The front end wheel portion 34 is rotatably mounted on the front end connection rod portion 33 and may rotate by contact friction. As an example, the front end wheel portions 34 may be rotatably mounted on both ends of the front end connection rod portion 33 and have a wheel shape to be in close contact with the ground or an inner wall of the pipe. The front end wheel portion 34 may rotate by friction when the body part 10 moves by an external force, and a motor may be directly provided in the front end wheel portion 34 to guide traveling as needed.

Figure 5:
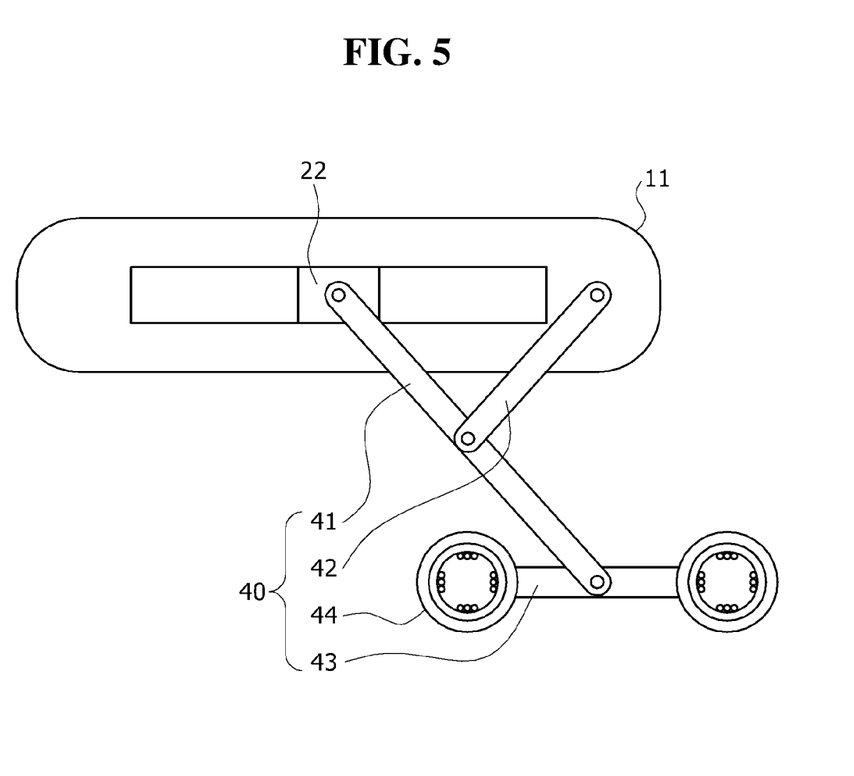
FIG. 5 is a schematic view illustrating a rear end traveling part according to an embodiment of the present disclosure.

FIG. 5 is a schematic view illustrating a rear end traveling part according to an embodiment of the present disclosure. Referring to FIG. 5, the rear end traveling part 40 according to the embodiment of the present disclosure includes a rear end main rod portion 41, a rear end support rod portion 42, a rear end connection rod portion 43, and a rear end wheel portion 44.

The rear end main rod portion 41 is rotatably mounted on the moving part 20. As an example, an upper end of the rear end main rod portion 41 may be rotatably mounted on the moving connection portion 22 and may be disposed obliquely downward in a rightward (rearward) direction of the body housing portion 11.

Both ends of the rear end support rod portion 42 are rotatably connected to a rear end of the body part 10 and the rear end main rod portion 41. As an example, the rear end support rod portion 42 may rotate in a state in which a position thereof is fixed to a rear end of the body housing portion 11 and may be rotatably connected to a central portion of the rear end main rod portion 41. Accordingly, a lower end of the rear end main rod portion 41 may move in a vertical direction.

The rear end connection rod portion 43 is rotatably connected to the rear end main rod portion 41. As an example, a central portion of the rear end connection rod portion 43 may be connected to a lower end of the rear end main rod portion 41. A pin spring for restoration may be embedded in the rear end connection rod portion 43.

The rear end wheel portion 44 is rotatably mounted on the rear end connection rod portion 43 and may rotate by contact friction. As an example, the rear end wheel portions 44 may be rotatably mounted on both ends of the rear end connection rod portion 43 and have a wheel shape to bring into close contact with the ground or an inner wall of the pipe. The rear end wheel portion 44 may rotate by friction when the body part 10 moves by an external force, and a motor may be directly provided in the rear end wheel portion 44 to guide traveling as needed.

Figure 6:
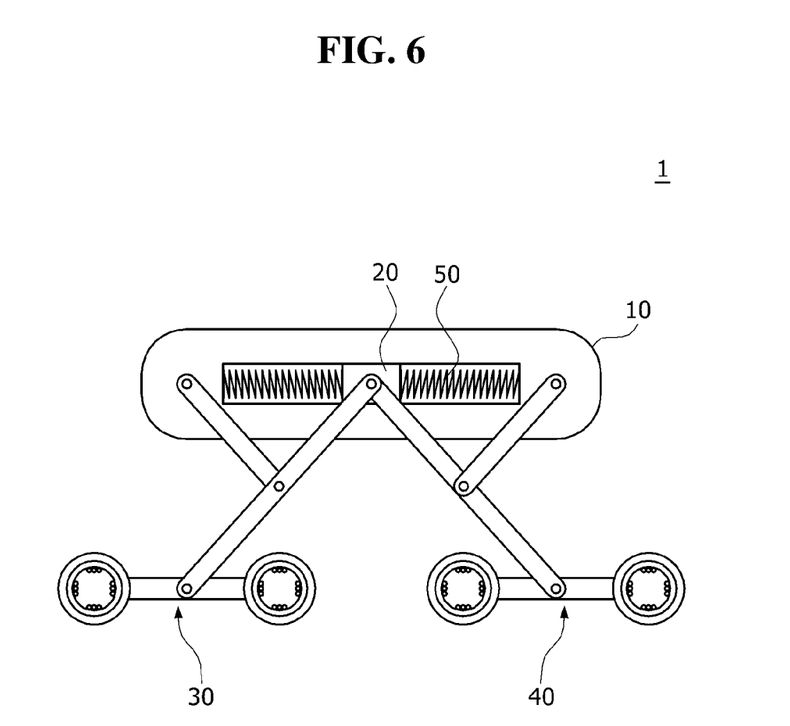
FIG. 6 is a schematic view illustrating a restoration part according to an embodiment of the present disclosure.

FIG. 6 is a schematic view illustrating a restoration part according to an embodiment of the present disclosure. Referring to FIG. 6, the robot traveling device 1 according to the embodiment of the present disclosure may further include a restoration part 50.

The restoration part 50 according to the embodiment of the present disclosure is supported by the body part 10 and provides a restoring force to the moving part 20. As an example, the restoration part 50 may be a spring-shaped elastic body or a cylinder of which a length may be adjusted by a hydraulic pressure or a pneumatic pressure and may be embedded in the body space portion 12 to elastically support both sides of the moving connection portion 22. The restoration part 50 may guide the moving connection portion 22 so that the moving connection portion 22 returns quickly.

Figure 7:
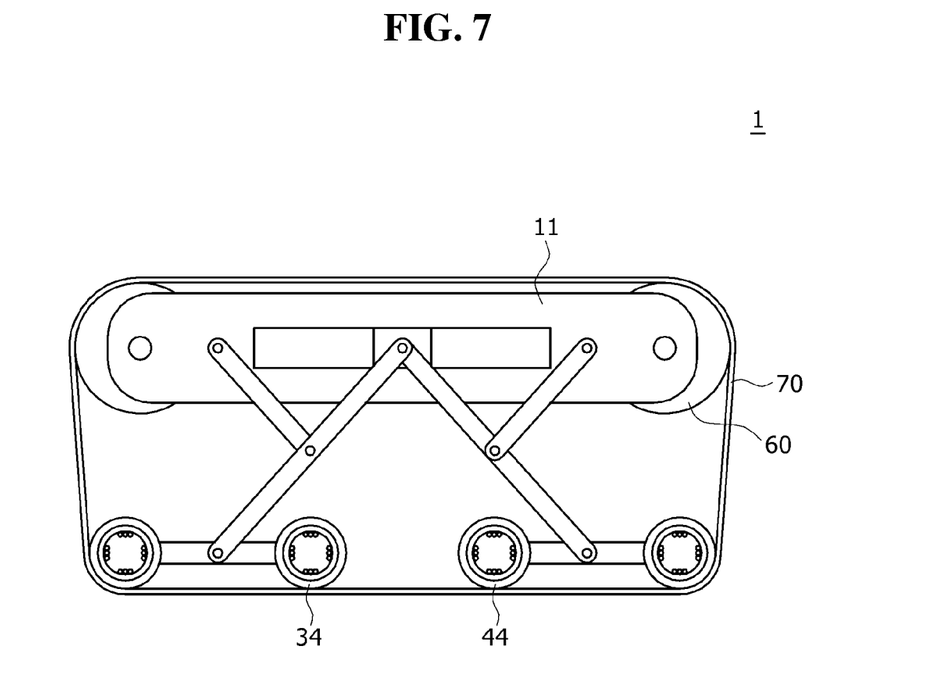
FIG. 7 is a schematic view illustrating a power generation unit and a traveling belt part according to an embodiment of the present disclosure.

FIG. 7 is a schematic view illustrating a power generation unit and a traveling belt part according to an embodiment of the present disclosure. Referring to FIG. 7, the robot traveling device 1 according to the embodiment of the present disclosure may further include a power generation unit 60 and a traveling belt part 70.

The power generation unit 60 is mounted on the body part 10 to generate power. As an example, the power generation unit 60 may be mounted on each of left and right ends of the body housing portion 11.

The traveling belt part 70 surrounds the body part 10, is supported by the front end traveling part 30 and the rear end traveling part 40, and moves the body part 10 while moving in a caterpillar manner by the power generation unit 60. As an example, the traveling belt part 70 may be a caterpillar surrounding the body housing portion 11 and supported by the front end wheel portion 34 and the rear end wheel portion 44. The traveling belt part 70 is engaged with the power generation unit 60, and when power is applied to the power generation unit 60, while supported by the front end wheel portion 34 and the rear end wheel portion 44, the traveling belt part 70 may move in a caterpillar manner to guide traveling of the body part 10.

Figure 8:
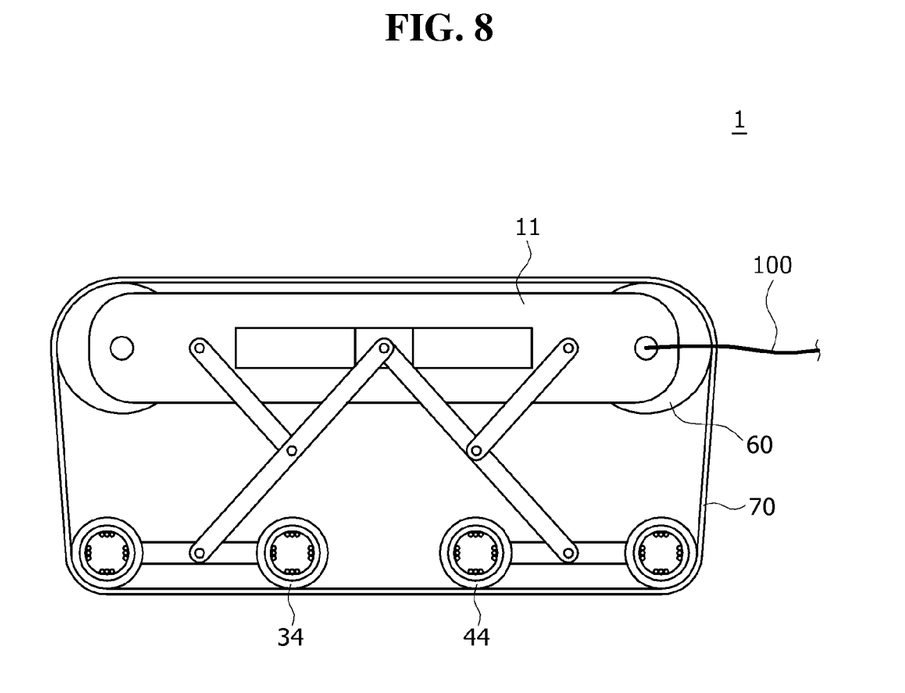
FIG. 8 is a schematic view illustrating a state in which the power generation unit is driven in a wired manner according to an embodiment of the present disclosure.

FIG. 8 is a schematic view illustrating a state in which the power generation unit is driven in a wired manner according to an embodiment of the present disclosure. Referring to FIG. 8, the power generation unit 60 is driven in a wired manner. As an example, the power generation unit 60 may be connected to a cable part 100 and may be driven by power supplied from the cable part 100. In this case, the cable part 100 may directly transmit a control signal to the power generation unit 60 or may be connected to a circuit board provided in the body housing portion 11 to transmit a control signal.

Figure 9:
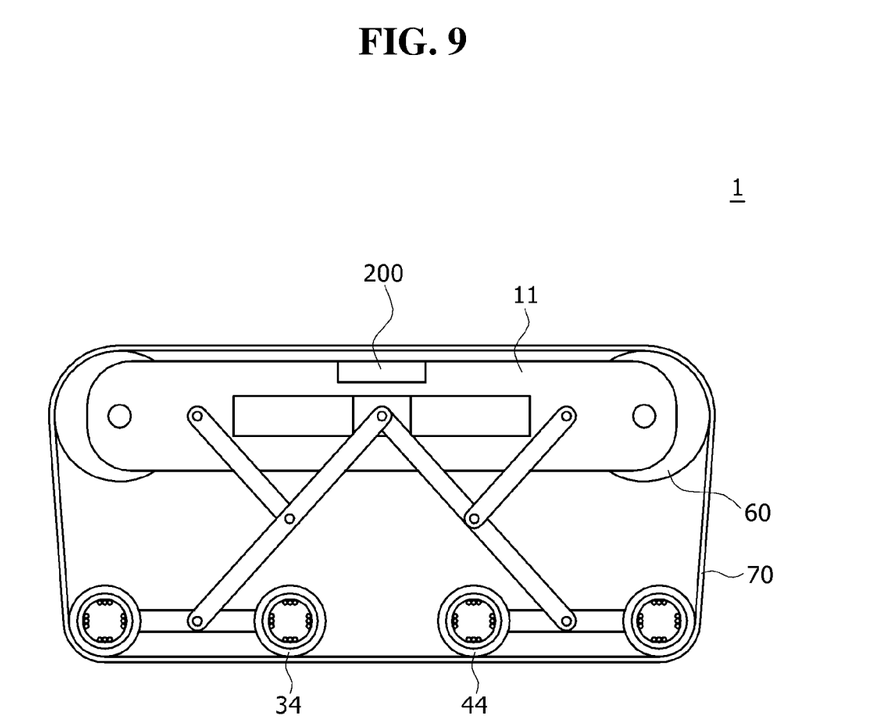
FIG. 9 is a schematic view illustrating a state in which the power generation unit is driven in a wireless manner according to an embodiment of the present disclosure.

FIG. 9 is a schematic view illustrating a state in which the power generation unit is driven in a wireless manner according to an embodiment of the present disclosure. Referring to FIG. 9, the power generation unit 60 is driven in a wireless manner. As an example, the power generation unit 60 may be connected to a battery part 200 provided in the body housing portion 11, and the circuit board may receive a remote signal provided from the outside to control the power generation unit 60.

Figure 10:
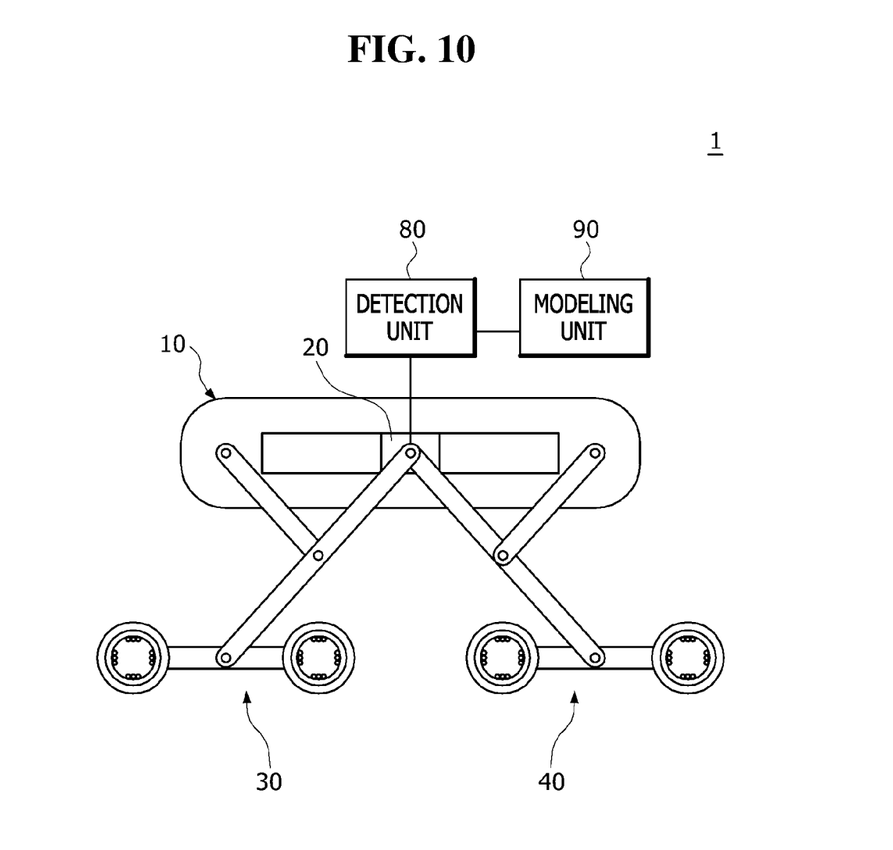
FIG. 10 is a schematic view illustrating a detection unit and a modeling unit according to an embodiment of the present disclosure.

FIG. 10 is a schematic view illustrating a detection unit and a modeling unit according to an embodiment of the present disclosure. Referring to FIG. 10, the robot traveling device 1 according to the embodiment of the present disclosure may further include a detection unit 80 and a modeling unit 90.

The detection unit 80 detects deformation of the front end traveling part 30 and the rear end traveling part 40. As an example, the detection unit 80 may detect heights of the front end traveling part 30 and the rear end traveling part 40 that raise or lower or rotational angles thereof.

The modeling unit 90 receives a detection signal of the detection unit 80 to model a pipe shape. As an example, the modeling unit 90 may model the pipe shape on a display device so that a user may visually identify the pipe shape.

An operation of the robot traveling device having the above structure according to an embodiment of the present disclosure will be described below.

The body space portion 12 is formed in the body housing portion 11, and the moving connection portion 22 is slidably connected to the moving line portion 21 disposed on the body space portion 12. The front end traveling part 30 and the rear end traveling part 40 are rotatably mounted on the moving connection portion. 22. The front end traveling part 30 and the rear end traveling part 40 support the traveling belt part 70, and the power generation unit 60 is engaged with the traveling belt part 70.

In this state, when the control signal is transmitted and the power generation unit 60 is operated, the body part 10 travels while the traveling belt part 70 moves in a caterpillar manner.

Meanwhile, when the front end traveling part 30 passes over an obstacle, the front end traveling part 30 raises while coming into contact with a protruding obstacle. Accordingly, while the moving connection portion 22 is pushed and moved, the load is distributed to the rear end traveling part 40.

Thus, since the load is automatically distributed to the front end traveling part 30 and the rear end traveling part 40, flexibility and a gripping force can be simultaneously satisfied during traveling even when a user encounters various obstacles, and an adhesive force with the traveling belt part 70 can be stably maintained. Further, the front end traveling part 30 and the rear end traveling part 40 are deformed according to a state of a traveling pipe, and the detection unit 80 may detect this deformation to predict the pipe shape.

In the robot traveling device 1 according to the embodiment of the present disclosure, the front end traveling part 30 and the rear end traveling part 40 are connected to the moving part 20 that slidably moves in the body part 10, the load applied to any one of the front end traveling part 30 and the rear end traveling part 40 is distributed to the other one thereof through the moving part 20, and thus the flexibility and gripping force of the module can be improved.

Although the present disclosure has been described with reference to embodiments illustrated in the drawings, the description is merely illustrative, and those skilled in the art to which the technology belongs could understand that various modifications and other equivalent embodiments may be made. Thus, the true technical scope of the present disclosure should be determined by the appended claims.

What is claimed is:
1. A robot traveling device comprising:
   a body part;
   a moving part that slidably moves in a longitudinal direction of the body part;
   a front end traveling part that is rotatably mounted on the body part and the moving part and is rotatable by contact friction; and
   a rear end traveling part that is rotatably mounted on the body part and the moving part and is rotatable by contact friction,
   wherein loads of the front end traveling part and the rear end traveling part are shared through the moving part,
   wherein the body part includes:
   a body housing portion having a length in a left-right direction; and
   a body space portion formed in a longitudinal direction of the body housing portion and providing a movement space for the moving part,
   wherein the moving part moves in the body space portion in a left right direction along the length of the body housing portion.

2. The robot traveling device of claim 1, wherein the moving part includes:
   a moving line portion disposed in the longitudinal direction of the body part; and
   a moving connection portion that slidably moves along the moving line portion.

3. The robot traveling device of claim 2, wherein the front end traveling part and the rear end traveling part are connected to the moving connection portion and are rotatable on a same axis.

4. The robot traveling device of claim 2, wherein the front end traveling part and the rear end traveling part are each rotatably connected to the moving connection portion.

5. The robot traveling device of claim 1, wherein the front end traveling part includes:
   a front end main rod portion rotatably mounted on the moving part;
   a front end support rod portion having both ends rotatably connected to a front end of the body part and the front end main rod portion;
   a front end connection rod portion rotatably connected to the front end main rod portion; and
   a front end wheel portion that is rotatably mounted on the front end connection rod portion and is rotatable by contact friction.

6. The robot traveling device of claim 1, wherein the rear end traveling part includes:
   a rear end main rod portion rotatably mounted on the moving part;
   a rear end support rod portion having both ends rotatably connected to a rear end of the body part and the rear end main rod portion;
   a rear end connection rod portion rotatably connected to the rear end main rod portion; and
   a rear end wheel portion that is rotatably mounted on the rear end connection rod portion and is rotatable by contact friction.

7. The robot traveling device of claim 1, further comprising a restoration part supported by the body part and configured to provide a restoring force to the moving part.

8. The robot traveling device of claim 1, further comprising:
   a power generation unit mounted on the body part and configured to generate power; and
   a traveling belt part that surrounds the body part, is supported by the front end traveling part and the rear end traveling part, and moves the body part while moving in a caterpillar manner by the power generation unit.

9. The robot traveling device of claim 8, wherein the power generation unit is driven in a wired or wireless manner.

* * * * *